(12) United States Patent
Churchill (10) Patent No.: US 8,343,654 B2
(45) Date of Patent: Jan. 1, 2013

(54) RECHARGEABLE BATTERY PACK

(75) Inventor: John Churchill, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 197 days.

(21) Appl. No.: 12/726,951

(22) Filed: Mar. 18, 2010

(65) Prior Publication Data

US 2010/0239903 A1    Sep. 23, 2010

(30) Foreign Application Priority Data

Mar. 21, 2009 (GB) .................................. 0904885.1

(51) Int. Cl.
*H01M 2/02* (2006.01)
(52) U.S. Cl. ........................................ 429/178; 429/163
(58) Field of Classification Search ................... 429/178
See application file for complete search history.

(56) References Cited

U.S. PATENT DOCUMENTS

| | | |
|---|---|---|
| 4,147,838 A | 4/1979 | Leffingwell |
| 4,976,173 A | 12/1990 | Yang |
| 5,504,412 A * | 4/1996 | Chan et al. ...................... 15/339 |
| 6,104,162 A * | 8/2000 | Sainsbury et al. ............. 320/111 |
| 2005/0214634 A1* | 9/2005 | Kim ................................ 429/53 |

FOREIGN PATENT DOCUMENTS

| | | |
|---|---|---|
| EP | 1 705 733 | 9/2006 |
| JP | 7-245087 | 9/1995 |

OTHER PUBLICATIONS

International Search Report and Written Opinion mailed on May 10, 2010 directed at application No. PCT/GB2010/050343; 10 pages.
GB Search Report dated Jul. 9, 2009 directed to counterpart GB Application No. 0904885.1 (1 page).

* cited by examiner

*Primary Examiner* — Raymond Alejandro
*Assistant Examiner* — Gary Harris
(74) *Attorney, Agent, or Firm* — Morrison & Foerster LLP (57) ABSTRACT

The invention relates to a rechargeable battery pack. Particularly, but not exclusively, the invention relates to a rechargeable battery pack for a battery powered appliance such as a hand held vacuum cleaner. The rechargeable battery pack includes at least one power interface for transferring power from the battery pack to an appliance during use and a single charger input terminal to which an output terminal of a battery charger is connectable during use for charging the battery pack, wherein the single charger input terminal is connectable to the output terminal of a battery charger when the battery pack is connected to an appliance and when the battery pack is not connected to an appliance.

8 Claims, 6 Drawing Sheets

RECHARGEABLE BATTERY PACK

REFERENCE TO RELATED APPLICATIONS

This application claims the priority of United Kingdom Application No. 0904885.1, filed Mar. 21, 2009, the entire contents of which are incorporated herein by reference.

FIELD OF THE INVENTION

The invention relates to a rechargeable battery pack. Particularly, but not exclusively, the invention relates to a rechargeable battery pack for a battery powered appliance such as a hand held vacuum cleaner.

BACKGROUND OF THE INVENTION

Many appliances are battery powered, and it is common to use battery packs containing rechargeable batteries. Such appliances are often supplied with a charger for charging the batteries. Such chargers may be designed to attach directly to the battery powered appliance in order to provide a charging current to the batteries. Alternatively the batteries or battery pack may be removed from the appliance and inserted into a charging dock of a charger.

A way of simplifying the method for charging such a battery pack is therefore desirable.

SUMMARY OF THE INVENTION

Accordingly, a first aspect the present invention provides a rechargeable battery pack comprising at least one power interface for transferring power from the battery pack to an appliance during use and a single charger input terminal to which an output terminal of a battery charger is connectable during use for charging the battery pack, wherein the single charger input terminal is connectable to the output terminal of a battery charger when the battery pack is connected to an appliance and when the battery pack is not connected to an appliance.

Such a rechargeable battery pack is advantageous over existing battery packs as it can be charged both on and off an appliance i.e it can be charged when connected to an appliance and it can be charged on its own when it is not connected to an appliance.

This is much simpler than existing battery packs which either need to be docked in a charging dock to be charged when they are removed from an appliance and/or they require multiple charger input terminals, at least one for use when the battery pack is connected to an appliance and a different charger input terminal for use when the battery pack is not attached to an appliance.

Preferably the battery pack houses one or more rechargeable batteries such as, for example, lithium-ion batteries. In a particular embodiment the battery pack may comprise 4 or 6 batteries.

The battery pack may include a casing having a top surface, a bottom surface and a plurality of side surfaces. The side surfaces preferably extend between the top surface and the bottom surface to form a generally rectangular shaped battery pack.

In a preferred embodiment the battery pack further comprises a connecting portion which in use allows the battery pack to be physically connected to an appliance. In a preferred embodiment the connecting portion may be a protrusion which may be insertable into a corresponding docking portion on the appliance. In a preferred embodiment the protrusion may be an upstanding protrusion which may extend from the top surface of the casing.

In a particular embodiment the at least one power interface may be provided on a surface of the protrusion, for example on a top or a side surface of the protrusion.

In a particular embodiment the at last one power interface may comprise a positive and a negative terminal. The terminals may be recessed into a surface of the battery pack, preferably a top surface of the protrusion.

The battery pack may also further comprise one or more logic terminals. Such logic terminals may be used to transfer data from the battery pack to the appliance or from the appliance to the battery pack.

In a particular embodiment the battery pack may also further comprises a control mechanism to prevent over and under charging of the battery pack. In addition the control mechanism may generates a battery ID signal which in use may be passed to an appliance to which the battery pack is attached. In a preferred embodiment such an appliance may only work when it is receiving the battery ID signal. In a preferred embodiment the control mechanism stops generating the battery ID signal when the battery pack 1 is being charged. This control mechanism may therefore prevent the appliance from working while the battery pack is being charged. In a preferred mechanism the control mechanism is generated by a PCB which may be located inside a casing of the battery pack.

The charger input terminal may be located anywhere on the battery pack but preferably is in the form of a recess for accepting the output terminal of a charger. Preferably the charger input terminal is recessed such that during charging the output terminal of the battery charger may be inserted into the recess in the battery pack. Preferably the charger input terminal is circular. The charger input terminal in a preferred embodiment may be located on the protrusion, for example on a side and/or rear surface of the protrusion.

According to a second aspect of the present invention there is provided a battery powered appliance comprising an appliance and a removable rechargeable battery pack having a single charger input terminal, wherein the rechargeable battery pack is chargeable via the single charger input terminal when the battery pack is attached to the appliance and when the battery pack is removed from the appliance.

In a preferred embodiment the appliance may be a vacuum cleaner for example a handheld vacuum cleaner.

Other features of the second aspect of the present invention may be as in accordance with the first aspect of the present invention.

In a particular embodiment the docking portion on the appliance may be a recess in a handle on the appliance. The docking portion may also further comprise a locking mechanism such as a snap fit mechanism, such that when the protrusion is inserted into the docking portion the battery pack is locked in place. A release catch may be provided on the battery pack or on the appliance which can be activated when desired to release the protrusion from the docking portion. In a preferred embodiment the release catch may be provided on the handle of the appliance.

Preferably the appliance comprises at least one corresponding power interface which corresponds to the power interface on the rechargeable battery pack. In a particular embodiment one or more positive and/or negative terminals may be proved on an inner surface of the docking portion, such that when the protrusion on the battery pack is inserted into the docking portion on the appliance the power interfaces come into contact.

The docking portion also may include one or more logic terminal contacts and a control mechanism/PCB as described in relation to the first embodiment.

In a particular embodiment the docking portion may comprise an aperture which lines up with the charger input terminal on the battery pack when the battery pack is docked in the docking portion. The output terminal of a battery charger may then be inserted through the aperture in the docking portion and into the charger input terminal. In a particularly preferred embodiment the aperture may be provided in a handle of the appliance.

According to a third aspect of the present invention there is provided a kit for a battery powered appliance comprising:
an appliance,
a rechargeable battery pack removably attached to the appliance, comprising at least one power interface for transferring power from the battery pack to the appliance during use and a single charger input terminal,
a charger having an output terminal,
wherein the output terminal is connectable to the single charger input terminal to charge the battery pack when the battery pack is removed from the appliance and when the battery pack is attached to the appliance.

Other features of the third aspect of the present invention may be as described in relation to the first or second embodiments.

BRIEF DESCRIPTION OF THE DRAWINGS

Embodiments of the invention will now be described with reference to the accompanying drawings, in which.

DETAILED DESCRIPTION OF THE INVENTION

Figure 1:
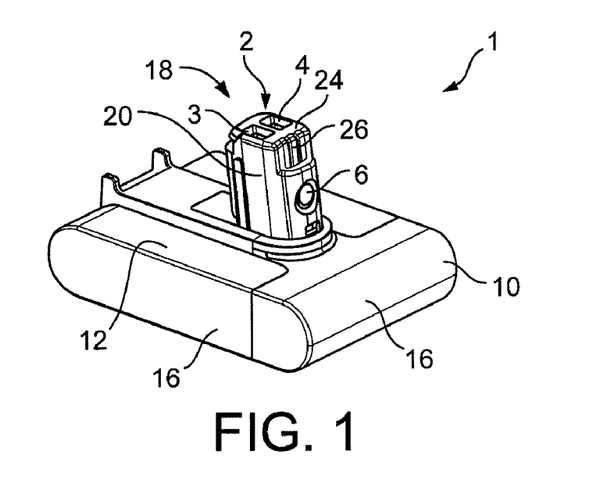
FIG. 1 is a rear perspective view of a rechargeable battery pack according to an embodiment of the present invention.
Figure 2:
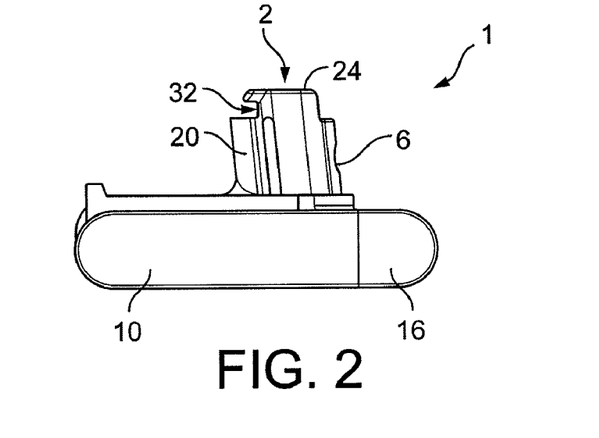
FIG. 2 is a side view of a rechargeable battery pack according to an embodiment of the present invention.
Figure 3:
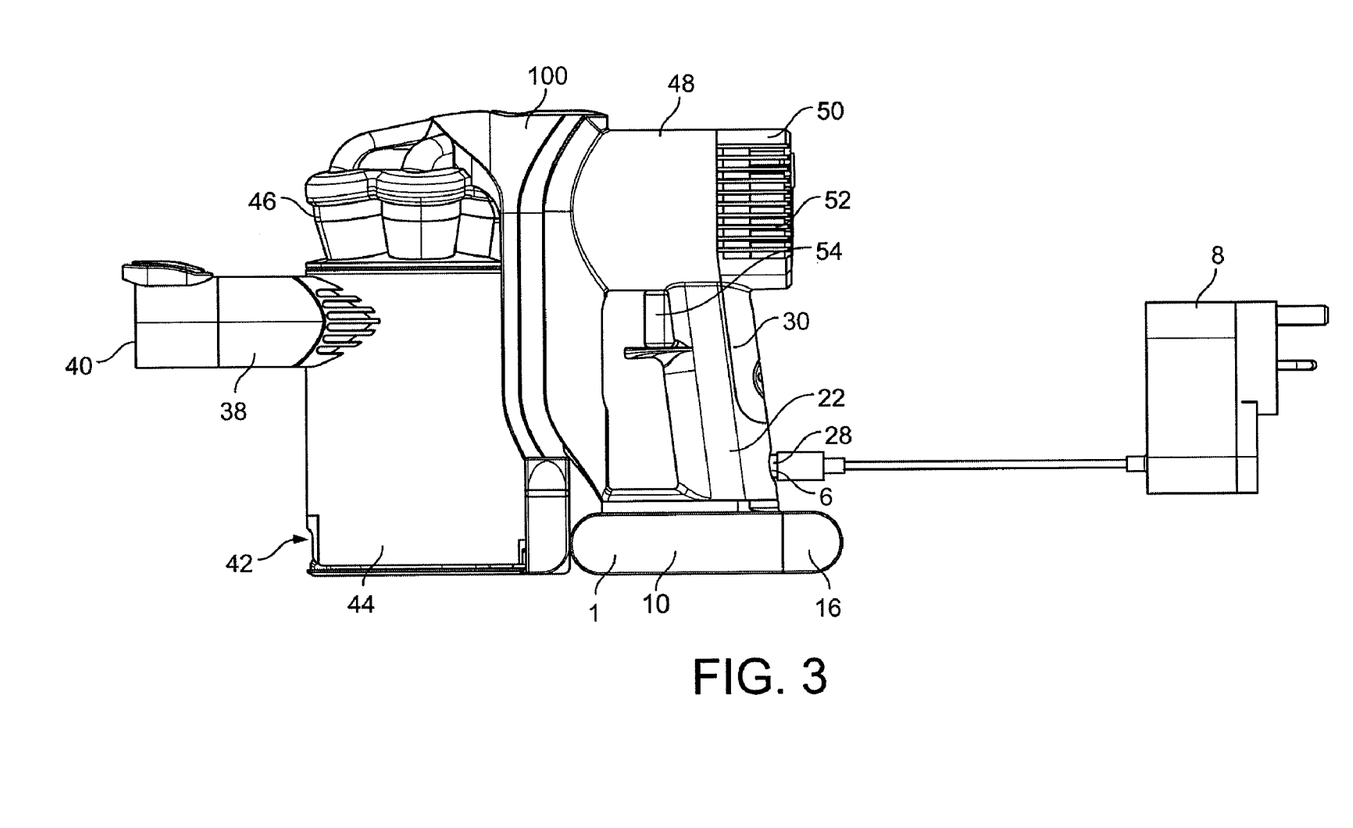
FIG. 3 is a side view of a hand held vacuum cleaner attached to a charger according to an embodiment of the present invention.
Figure 4:
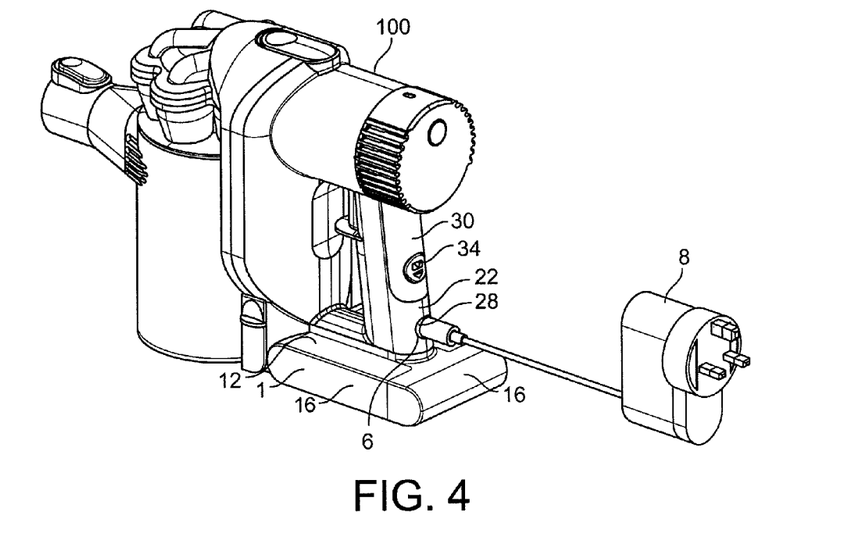
FIG. 4 is a rear perspective view of a handheld vacuum cleaner attached to a charger according to an embodiment of the present invention.

FIGS. 1 and 2 show a rechargeable battery pack (indicated generally at 1) suitable for powering an appliance, such as the handheld vacuum cleaner 100 shown in FIGS. 3 and 4. The rechargeable battery pack 1 comprises a power interface (indicated generally at 2) in the form of a positive and a negative terminal 3, 4 for transferring power from the battery pack 1 to the appliance 100 during use. These terminals 3, 4 are therefore connectable to corresponding terminals (not shown) in the appliance 100.

The battery pack 1 also further comprises a single charger input terminal 6 to which a battery charger (see 8 in FIGS. 5 and 6) is connectable for charging the battery pack 1 when the battery pack 1 is connected to the appliance 100 and when the battery pack is unattached. This is shown in more detail in FIGS. 3 to 6.

Figure 5:
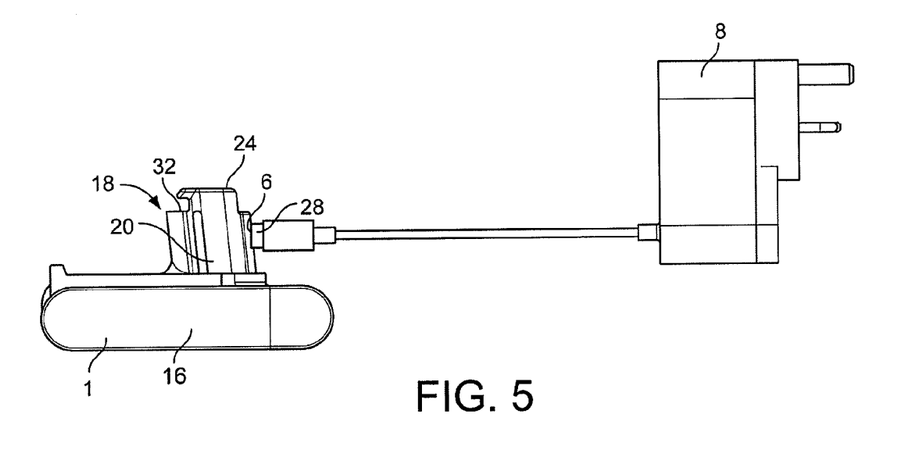
FIG. 5 is a side view of a rechargeable battery pack attached to a charger according to an embodiment of the present invention
Figure 6:
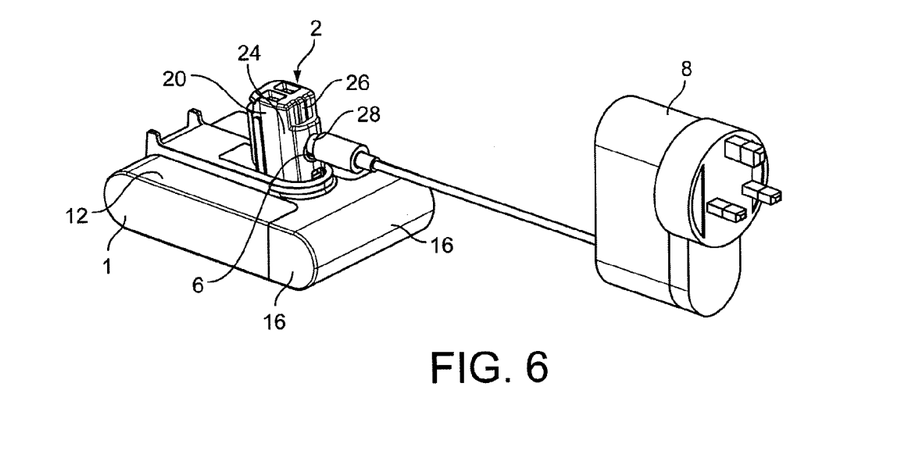
FIG. 6 is a rear perspective view of a rechargeable battery pack attached to a charger according to an embodiment of the present invention
Figure 7:
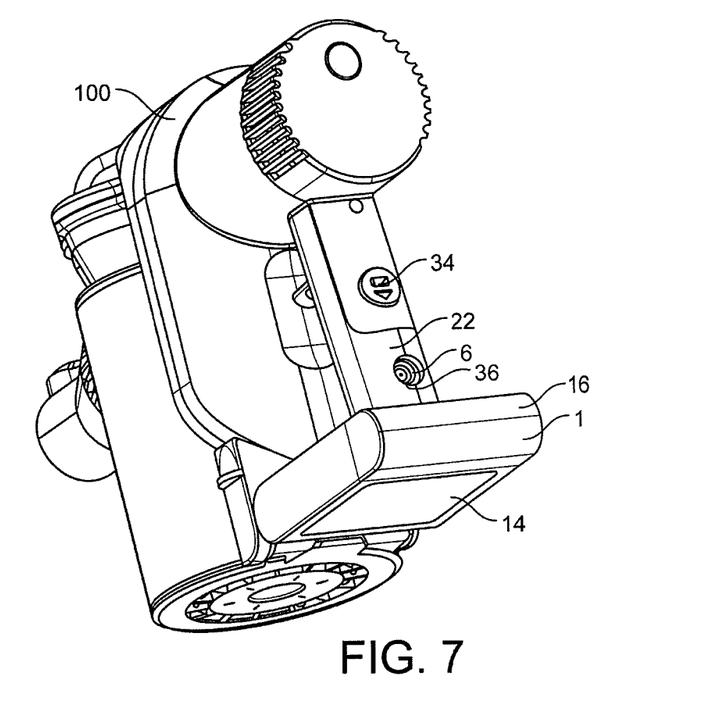
FIG. 7 is a rear perspective view from underneath of a handheld vacuum cleaner with an attached rechargeable battery pack according to an embodiment of the present invention.
Figure 8:
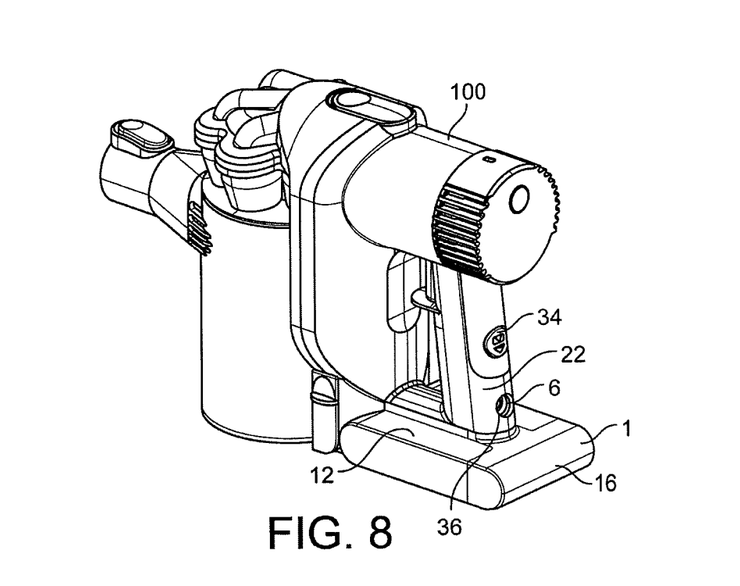
FIG. 8 is a rear perspective view from above of a handheld vacuum cleaner with an attached rechargeable battery pack according to an embodiment of the present invention.

In FIGS. 3 and 4 an embodiment can be seen where the battery charger 8 is connected via its output terminal 28 to the charger input terminal 6 of the battery pack 1 for charging the battery pack 1 while it is attached to an appliance. In FIGS. 5 and 6 it can be seen that the output terminal 28 of the battery charger 8 is connected to the same single charger input terminal 6 when the battery pack is not connected to the appliance.

This battery pack 1 is therefore very advantageous as it can be charged both on and off the vacuum cleaner via the same charger input terminal 6.

Preferably the battery pack 1 houses one or more rechargeable batteries (not shown), for example, lithium-ion batteries. In a particular embodiment the battery pack 1 may comprise 4 or 6 batteries.

The battery pack 1 has a casing 10 having a top surface 12, a bottom surface 14 and a plurality of side surfaces 16. The side surfaces 16 preferably extend between the top surface 12 and the bottom surface 14 to form a generally rectangular shaped battery pack 1. In the embodiment shown it can be seen that two of the side surfaces 16 are curved. One or more of the other surfaces 16, 12, 14 of the casing 10 may also be curved.

Figure 9:
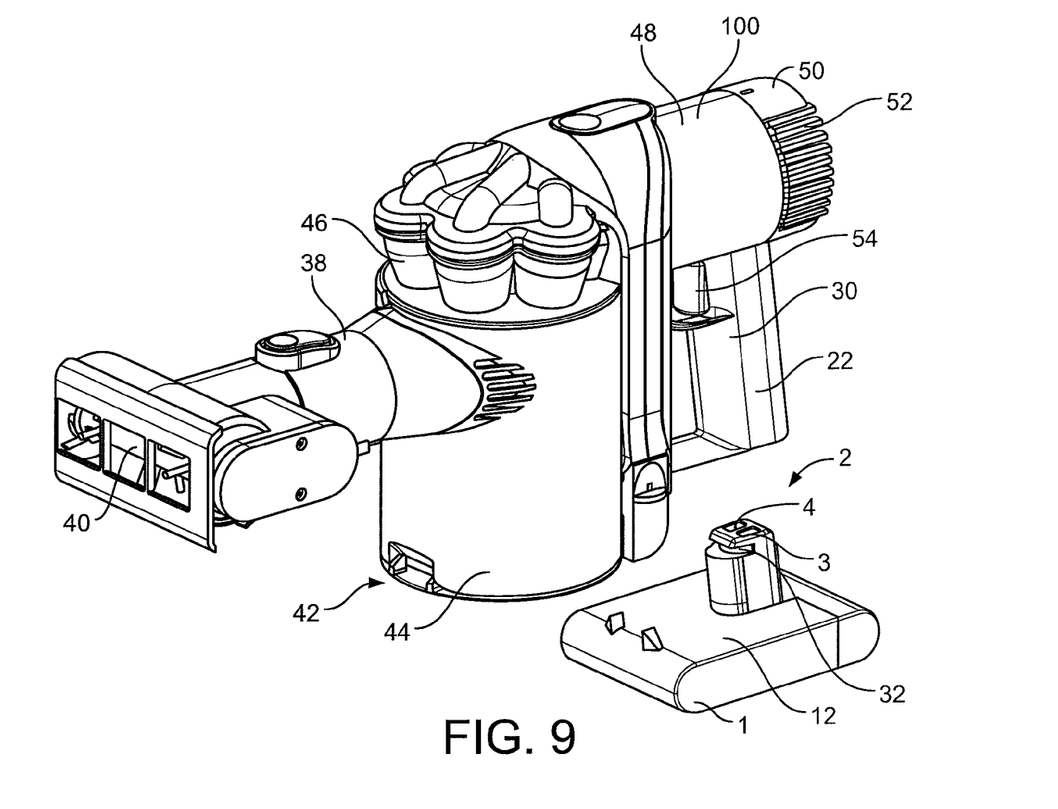
FIG. 9 is a side perspective view of a rechargeable battery about to be attached to a handheld vacuum cleaner according to an embodiment of the present invention.

The battery pack 1 also has a connecting portion (indicated generally at 18) which in use allows the battery pack 1 to be physically connected to the vacuum cleaner 100. In the embodiment shown in the Figures the connecting portion 18 is in the form of a protrusion 20 which can be inserted into a corresponding docking portion 22 on the vacuum cleaner 100. FIGS. 3 and 4 show the protrusion 20 docked inside the vacuum cleaner 100 and FIG. 9 shows the protrusion 20 lined up with docking portion 22 on the appliance. From this position the protrusion 20 can be inserted into the docking portion 22 to connect the battery pack 1 with the vacuum cleaner 100. It can be seen that the protrusion 20 is upstanding and extends from the top surface 12 of the casing 10.

The at least one power interface 2 is provided on a top surface 24 of the protrusion 20. The power interface 2 comprises positive and a negative terminal 3, 4. The terminals 3, 4 are recessed into the top surface 24 of the protrusion 20.

The battery pack 1 also further comprises a plurality of logic terminals 26. The logic terminals 26 are used to transfer data from the battery pack 1 to the appliance 100 or from the appliance 100 to the battery pack 1. In a particular embodiment the battery pack 1 may also further comprise a control mechanism (not shown) to prevent over and under charging of the battery pack and over heating of the battery pack. The control mechanism may also generate a battery ID signal which is passed to the vacuum cleaner 100.

In a preferred embodiment the vacuum cleaner 100 will only work when it is receiving the battery ID signal. The control mechanism may be arranged such that it stops generating the battery ID signal when the battery pack 1 is being charged. This control mechanism can therefore prevent the vacuum cleaner 100 from working while the battery pack 1 is being charged. In a preferred mechanism the control mechanism is generated by a PCB which is housed inside the casing 10 of the battery pack 1.

The charger input terminal 6 is located on a rear side surface 29 of the protrusion 20 at a rear end of the battery pack 1. The charger input terminal 6 is in the form of a recess for accepting the output terminal 28 of the battery charger 8. The charger input terminal 6 is recessed such that during charging of the battery pack 1 the entire output terminal 28 of the battery charger 8 is inserted into the recess in the battery pack 1. In the Figures it can be seen that the charger input terminal 6 and the output terminal 28 of the battery charger 8 are circular in cross section. The output terminal 28 of the battery charger 8 may be a so-called dual output charger, in that it is able to charge multiple types of rechargeable battery pack. For example, the battery charger 8 may be able to charge both a 6 cell and a 4 cell battery pack. In order to do so the output terminal 28 of the battery charger 8 may comprise 3 terminal pins. In an embodiment the first pin may be a 25.6 Volt pin, the second pin may be 18.6 Volt pin and the third pin may be a 0 Volt pin. The battery pack 1 preferably comprises a PCB with a control system which allows the battery pack 1 to select the appropriate charging voltage automatically, for example using preset wiring. For example if a 6 cell battery pack 1 requires 25.6 Volts for charging, the control mechanism would allow the battery pack to select pin 1 and pin 3 for charging.

In the embodiment shown in FIG. 9 the docking portion 22 on the vacuum cleaner 100 is a recess in a handle 30. The protrusion 20 and/or the docking portion 22 also preferably further comprises a locking mechanism 32 such as a snap fit mechanism, such that when the protrusion 20 is inserted into the docking portion 22 the battery pack 1 is locked in place on the vacuum cleaner 100. A release catch 34 is provided on the handle 30 of the vacuum cleaner 100. This release catch 34 can be activated when desired to release the battery pack 1 from the docking portion 22.

In the embodiments shown in FIGS. 3, 4, 7 and 8 it can be seen that the docking portion 22, which in this case is inside the handle 30 of the vacuum cleaner 100, comprises an aperture 36 which lines up with the charger input terminal 6 on the battery pack 1 when the protrusion 20 is docked in the docking portion 22. The output terminal 28 of the battery charger 8 can therefore be inserted through the aperture 36 in the handle 30 and into the charger input terminal 6. This aperture may of course be replaced by a cut out of some other sort which allows the output terminal 28 of the battery charger 8 to be inserted into the charger input terminal 6 when the battery pack 1 is attached to the vacuum cleaner 100. Alternatively the charger input terminal 6 may be located in a position on the battery pack 1 which is remote from the connecting portion 18.

As can be seen in the Figures the appliance may be a hand-held vacuum cleaner 100 although it could be any sort of battery powered appliance, for example be any sort of battery powered floor or air cleaning appliance or indeed any sort of power tool.

In FIGS. 3, 4, 7, 8 and 9 it can be seen that the hand-held vacuum cleaner 100 comprises a suction conduit 38 having a suction opening 40. The vacuum cleaner 100 also includes cyclonic separating apparatus 42 for separating dirt and dust from an airflow drawn in through the suction opening 40. The cyclonic separating apparatus 42 is in communication with the suction conduit 38 and the suction opening 40. The cyclonic separating apparatus 42 comprises an upstream cyclone 44 and a plurality of downstream cyclones 46.

The vacuum cleaner 100 further includes a motor housing 48 and a removable casing 50 having a plurality of exhaust vents 52 formed therein. An air flow path extends from the suction opening 40, through the suction conduit 38, the cyclonic separating apparatus 42 and the motor housing 48 to the exhaust vents 52. The handle 30 which forms the docking portion 22 for the battery pack 1 is located below the motor housing 48 for manipulating the hand-held vacuum cleaner 100 when in use. The handle 30 is arranged so that the cyclonic separating apparatus 42 is located between the handle 30 and the suction opening 40. The handle 30 also includes a trigger switch 54 which is positioned on a side of the handle 30 closest to the suction opening 40 such that the trigger switch 54 can be manipulated by a user's index finger. The battery pack 1 is connected to the handle 30 as discussed above.

When operating, a motor (not shown), driven by the battery pack 1, draws a flow of dirt- and dust-laden air into the suction opening 40, through the suction conduit 38 and into the cyclonic separating apparatus 42. The cleaned air exits the cyclonic separating apparatus 42 and passes sequentially through a pre-motor filter if present and the motor before being exhausted through the exhaust vents 52.

When the battery pack 1 needs recharging, it can be charged on or off the vacuum cleaner 100. To charge the battery pack 1 on the vacuum cleaner a user simple inserts the output terminal 28 of a battery charger 8 into the charger input terminal 6 on the battery pack. In the embodiments shown in FIGS. 3, 4, 7 and 8 this would be through the aperture 36 formed in the wall of the handle 30. Alternatively, the battery pack 1 may be removed from the vacuum cleaner 100 by pressing the release catch 34. The output terminal 28 of a battery charger 8 can then be inserted into the charger input terminal 6 on the battery pack 1. If the user has a spare battery pack 1, this can be used to power the appliance while the original battery pack 1 is being charged off the vacuum cleaner 100.

The invention is not limited to the features of the specific embodiment described above. Variations will be apparent to the person skilled in the art.

The invention claimed is:

1. A rechargeable battery pack comprising at least one power interface for transferring power from the battery pack to an appliance during use and a single charger input terminal to which an output terminal of a battery charger is connectable during use for charging the battery pack, wherein the rechargeable battery pack comprises one or more lithium-ion batteries, wherein the single charger input terminal is connectable to the output terminal of the battery charger when the battery pack is connected to the appliance and when the battery pack is not connected to the appliance, the rechargeable battery pack further comprising a connecting portion which in use allows the battery pack to be physically connected to the appliance, wherein the connecting portion is an upstanding protrusion which extends from a top surface of a casing of the battery pack, wherein the connecting portion is insertable into a docking portion on the appliance, and wherein the charger input terminal is located on the protrusion.

2. A rechargeable battery pack according to claim 1 further comprising one or more logic terminals.

3. A rechargeable battery pack according to claim 1 wherein the charger input terminal is in the form of a recess in the battery pack.

4. A battery powered handheld vacuum cleaner including a removable rechargeable battery pack having a single charger input terminal, wherein the rechargeable battery pack is chargeable via the single charger input terminal when the battery pack is attached to the vacuum cleaner and when the battery pack is removed from the vacuum cleaner, wherein the battery pack comprises one or more lithium-ion batteries, wherein the rechargeable battery pack further comprises an upstanding protrusion which is insertable into a docking portion on the vacuum cleaner, and wherein the docking portion further comprises an aperture which lines up with the charger input terminal on the battery pack when the battery pack is docked in the docking portion.

5. A battery powered handheld vacuum cleaner according to claim 4 wherein the rechargeable battery pack further comprises at least one power interface for transferring power from the battery pack to the handheld vacuum cleaner during use.

6. A battery powered handheld vacuum cleaner according to claim 4 wherein the docking portion is a recess in a handle on the handheld vacuum cleaner.

7. A battery powered handheld vacuum cleaner according to claim 4 wherein the docking portion further comprises a locking mechanism.

8. A kit for a battery powered handheld vacuum cleaner comprising:

a battery powered vacuum cleaner, a rechargeable battery pack removably attached to the vacuum cleaner, comprising at least one power interface for transferring power from the battery pack to the handheld vacuum cleaner during use, a single charger input terminal, and one or more lithium-ion batteries, and a charger having an output terminal, wherein the output terminal is connectable to the single charger input terminal to charge the battery pack when the battery pack is removed from the vacuum cleaner and when the battery pack is attached to the vacuum cleaner, wherein the rechargeable battery pack further comprises an upstanding protrusion which is insertable into a docking portion on the vacuum cleaner, and wherein the docking portion further comprises an aperture which lines up with the charger input terminal on the battery pack when the battery pack is docked in the docking portion.

* * * * *